United States Patent
Mohapatra et al.

(10) Patent No.: US 9,720,927 B2
(45) Date of Patent: Aug. 1, 2017

(54) METHOD AND SYSTEM FOR DATABASE STORAGE MANAGEMENT

(75) Inventors: Abhijeet Mohapatra, Stanford, CA (US); Michael Genesereth, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 13/548,105

(22) Filed: Jul. 12, 2012

(65) Prior Publication Data

US 2013/0097127 A1    Apr. 18, 2013

Related U.S. Application Data

(60) Provisional application No. 61/572,157, filed on Jul. 12, 2011.

(51) Int. Cl.
*G06F 7/00*    (2006.01)
*G06F 17/00*    (2006.01)
*G06F 17/30*    (2006.01)

(52) U.S. Cl.
CPC .. *G06F 17/30153* (2013.01); *G06F 17/30321* (2013.01); *G06F 17/30327* (2013.01); *G06F 17/30336* (2013.01); *G06F 17/30946* (2013.01)

(58) Field of Classification Search
None
See application file for complete search history.

(56) References Cited

U.S. PATENT DOCUMENTS

| | | | | |
|---|---|---|---|---|
| 5,966,709 | A * | 10/1999 | Zhang | H03M 7/3084 |
| 6,941,303 | B2 * | 9/2005 | Perrizo | G06F 17/30961 |
| 8,396,844 | B1 * | 3/2013 | Balkany | G06F 17/30327 707/693 |
| 2002/0141422 | A1 * | 10/2002 | Hu | 370/408 |
| 2004/0243553 | A1 * | 12/2004 | Bailey | 707/3 |
| 2008/0016074 | A1 * | 1/2008 | Ben-dyke | G06F 17/30595 |
| 2010/0030796 | A1 * | 2/2010 | Netz et al. | 707/101 |
| 2010/0235335 | A1 | 9/2010 | Heman et al. | |
| 2011/0137916 | A1 * | 6/2011 | Deen et al. | 707/747 |

OTHER PUBLICATIONS

Douglas Comer. 1979. Ubiquitous B-Tree. ACM Comput. Surv. 11, 2 (Jun. 1979), pp. 121-137.*
"B+ tree", Wikipedia, Retrieved from https://en.wikipedia.org/wiki/B%2B_tree, 6 pgs.

(Continued)

*Primary Examiner* — Jason Liao
*Assistant Examiner* — David T Brooks
(74) *Attorney, Agent, or Firm* — KPPB LLP

(57) ABSTRACT

Embodiments of the present invention relate to run-length encoded sequences and supporting efficient offset-based updates of values while allowing fast lookups. In an embodiment of the present invention, an indexing scheme is disclosed, herein called count indexes, that supports O(log n) offset-based updates and lookups on a run-length sequence with n runs. In an embodiment, count indexes of the present invention support O(log n) updates on bitmapped sequences of size n. Embodiments of the present invention can be generalize to be applied to block-oriented storage systems.

20 Claims, 18 Drawing Sheets

(56) References Cited

OTHER PUBLICATIONS

Abadi et al., "Column oriented database systems", Proceedings of the VLDB Endowment (PVLDB), Aug. 24-28, 2009, 2 pgs.
Fenwick, Peter, "A New Data Structure for Cumulative Frequency Tables", Software: Practice and Experience, Mar. 1994, 24(3), pp. 327-336.
Grund, M. et al., "Vertical Partitioning in Insert-only Scenarios for Enterprise Applications", Industrial Engineering and Engineering Management, 2009, 16th International Conference on Oct. 21-23, 2009, 6 pgs., DOI: 10.1109/ICIEEM.2009.5344485.
Kreuger et al., "Enterprise Application-Specific Data Management", Enterprise Distributed Object Computing Conference (EDOC), 14th IEEE International, Oct. 25-29, 2010, 11 pgs., DOI: 10.1109/EDOC.2010.28.
Lemire, D. et al., "Sorting improves word-aligned bitmap indexes", Computing Research Repository (CoRR), 2009.
Stonebraker, M. "C-Store: A Column-oriented DBMS", Proceedings of the 31st VLDB Conference, Trondheim, Norway, 2005.

* cited by examiner

CreateIndex $([c_i], n)$
  if $n = 1$ then
    return $c_i$
  else
    for $i = 1$ to $n - 1$ do
      $j \leftarrow \frac{i+1}{2}$
      $d_j.parent \leftarrow d_j$
      $d_j.lchild \leftarrow c_i$      $d_j.rchild \leftarrow c_{i+1}$
      $d_j.count = c_i.count + c_{i+1}.count$
      $c_{i+1}.parent = c_{i+1}.parent \leftarrow d_j$
      $i \leftarrow i + 2$
    end for
    if $n \equiv 0 \pmod 2$ then
      return CreateIndex $([d_i], \frac{n}{2})$
    else
      $d_j.parent \leftarrow d_j$
      $d_j.count = c_i.count$
      $d_j.lchild \leftarrow c_i$      $d_j.rchild \leftarrow$ NULL
      $c_i.parent \leftarrow d_j$
      return CreateIndex $([d_i], \frac{n+1}{2})$
    end if
  end if

Fig. 2

SearchCountIndex (p, node)
    if node has no children then
        return value at node
    else
        lchild ← left child of node
        v ← value at lchild
        if v > p then
            SearchCountIndex (p, lchild)
        else
            SearchCountIndex (p − v, rchild)
        end if
    end if

Fig. 3

Table 1: Performance of count indexes on various encoding schemes
$N$ = number of values and $n$ = number of runs

| Encoding Scheme | create | look-up | update | bulk insert ($k$ contiguous runs) |
|---|---|---|---|---|
| Run-length Encoding | $O(n)$ | $O(\log n)$ | $O(\log n)$ | $O(k + \log n)$ |
| Bitmap Encoding (parallel operations) | $O(n)$ | $O(\log n)$ | $O(\log n)$ | $O(k + \log n)$ |
| Uncompressed | $O(N + n)$ | $O(\log n)$ | $O(\log n)$ | $O(k + \log n)$ |

Fig. 12 (Table 1)

Insert(Node $N$, Count $C$, Value $V$)
if $N$ is not full then
    Insert $\langle V, C \rangle$ into $N$
    Update the sum of the counts of $N$ and its ancestors
else
    Create a new node $M$
    Move $\langle V, C \rangle$ and half of the values or pointers and
    the counts present in $N$ over to $M$
    Update the sum of the counts of $N$ and $M$
    $P \leftarrow$ parent of $N$
    $C' \leftarrow$ Sum of the counts of $M$
    Insert($P, C', M$)
end if

Fig. 14a

Delete(Node $N$, Count $C$, Value $V$)
if $N$ is exactly half-filled then
    Delete $\langle V, C \rangle$ into $N$
    if all neighbors of $N$ are half-filled then
        Merge a neighbor of $N$ say $M$ with $N$
        $P \leftarrow$ parent of $M$
        Suppose $C'$ $\leftarrow$ Sum of counts of $M$
        Delete($P, C', M$)
    else
        $M$ is a neighbor of $N$ which is more than half-filled
        Let $Q$ be a pointer contained in $M$ which is closest to $N$
        Let the sum of counts of $Q$ be $C'$
        Delete($M, C', Q$)
        Insert($N, C', Q$)
    end if
    Update the sum of the counts of $N$ and its ancestors
else
    Delete $\langle V, C \rangle$ from $N$
    Update the sum of the counts of $N$ and its ancestors
end if

Fig. 14b

METHOD AND SYSTEM FOR DATABASE STORAGE MANAGEMENT

CROSS-REFERENCE TO RELATED APPLICATIONS

This application claims priority to U.S. Provisional Application No. 61/572,157 filed Jul. 12, 2011, which is hereby incorporated by reference in its entirety for all purposes.

FIELD OF THE INVENTION

The present invention is related generally to database storage management systems. More specifically, it relates to column-store database storage techniques providing both fast lookups and updates.

BACKGROUND OF THE INVENTION

Run-length encoding and bitmap encoding are popular compression schemes that are used in column stores to compress attribute values. These compression schemes are sensitive to the tuple ordering and require support for efficiently updating tuples at given offsets. A column store relation with n tuples can be updated in O(n) time. While techniques have been proposed that amortize the update cost by buffering updates in a differential store, such techniques use a table scan to apply the updates. Further, these techniques require the original relation to be decompressed and subsequently re-compressed after applying the updates thus leading to added time complexity.

Since Stonebraker et al.'s seminal paper (M. Stonebraker, D. J. et al. *C-store: a column-oriented dbms*. In VLDB, 2005; this and all other references are herein incorporated by reference for all purposes), column stores have become a preferred platform for data warehousing and analytics. A case study in (J. Krueger et al. *Enterprise application-specific data management*. In EDOC, 2010) shows that present enterprise systems are best served by column stores. Column stores provide support for compression of attribute values in order to support fast reads. Data compression, however, presents a significant bottleneck for updating relations. Compression schemes such as run-length encoding and bitmap encoding are sensitive to the ordering of tuples as has been shown in (D. Lemire et al. *Sorting improves word-aligned bitmap indexes*. CoRR, 2009). Hence, in order to incrementally maintain relations while achieving good compression, column stores have to support offset-based or in-place update of tuples.

Prior art implementations have proposed different techniques to amortize the cost of applying updates to a column store relation in bulk. A central theme underlying certain prior art techniques is to maintain a differential store in addition to a read-optimized store. Updated tuples are buffered in the differential store and are subsequently merged with the read-optimized store using a merge scan. Although such a differential update mechanism amortizes the time to apply updates in bulk, it cannot avoid the linear cost of a merge scan.

SUMMARY OF THE INVENTION

Embodiments of the present invention relate to run-length encoded sequences and supporting efficient offset-based updates of values while allowing fast lookups. In an embodiment of the present invention, an indexing scheme is disclosed, herein called count indexes, that supports O(log n) offset-based updates and lookups on a run-length sequence with n runs. In an embodiment, count indexes of the present invention support O(log n) updates on bitmapped sequences of size n. Embodiments of the present invention can be generalize to be applied to block-oriented storage systems.

Among other things, an indexing scheme is disclosed that optimizes a trade-off between the time to look up a value and the time to update the sequence. An indexing scheme according to embodiments of the present invention is discussed as count indexes. In certain embodiments of the present invention, count indexes can be understood as a binary tree on a sequence of integers. In an embodiment of the present invention, the integers are stored in the leaf nodes of the binary tree. In an embodiment, every interior node in the count index stores the sum of its children's values. The root of the count index stores the total sum of integers in the sequence.

In embodiments of the present invention, every node in a count index stores the sum of the values of its children. To construct a count index on a sequence of n integers, the integers are divided into groups of two. If n is odd, a group is created for the last count. The sum of the counts of the integers is then computed in each of the $$\lceil \frac{n}{2} \rceil$$

groups and the count index is recursively built on these $$\lceil \frac{n}{2} \rceil$$

sums. In the disclosure below, an algorithm according to an embodiment of the present invention is presented.

These and other embodiments can be more fully appreciated upon an understanding of the detailed description of the invention as disclosed below in conjunction with the attached figures.

BRIEF DESCRIPTION OF THE DRAWINGS

The following drawings will be used to more fully describe embodiments of the present invention.

FIG. 2 is an example of an algorithm for creating a count index according to an embodiment of the present invention.

FIG. 3 is an example of an algorithm to lookup values in a count index according to an embodiment of the present invention.

FIG. 12 (Table 1) is a table of performance of count indexes on various encoding schemes according to embodiments of the present invention.

FIGS. 14*a* and *b* are examples of algorithms for creating a count index according to an embodiment of the present invention.

DETAILED DESCRIPTION OF THE INVENTION

Figure 13:
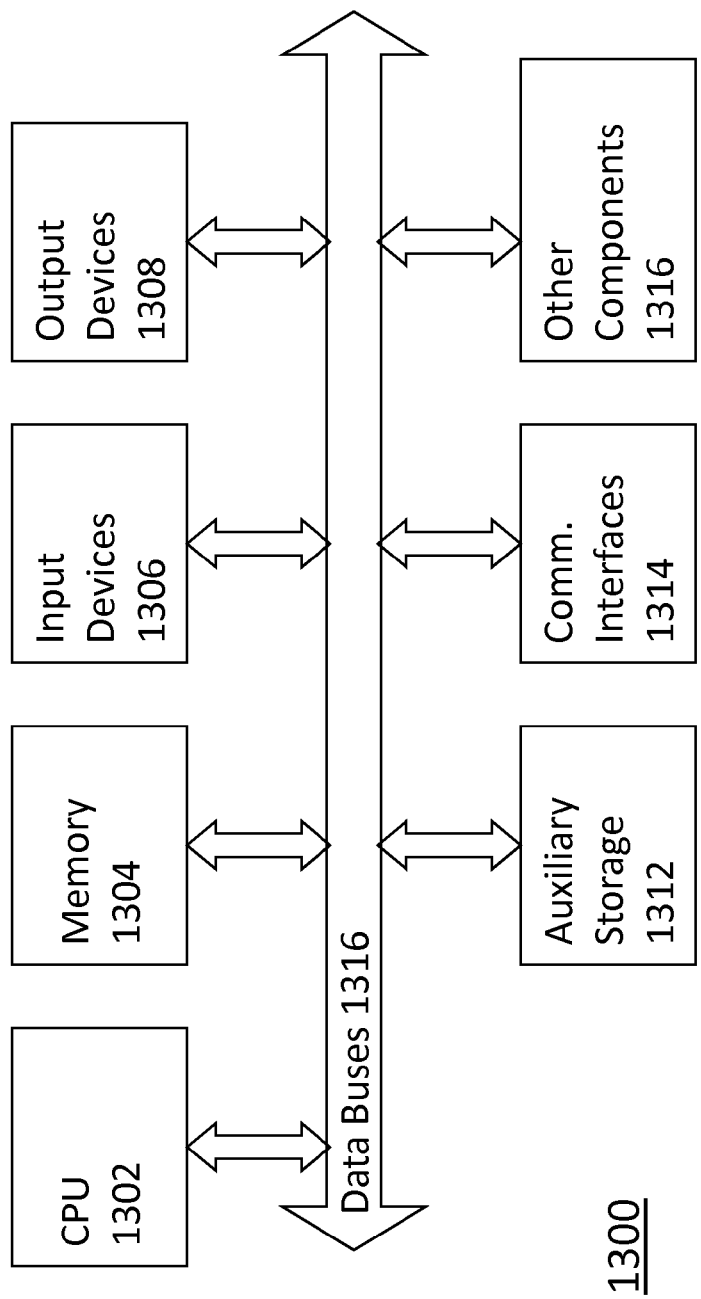
FIG. 13 is a block diagram of a computer system on which the present invention can be implemented.

Among other things, the present invention relates to methods, techniques, and algorithms that are intended to be implemented in a digital computer system 100 such as generally shown in FIG. 13. Such a digital computer or embedded device is well-known in the art and may include the following.

Computer system 1300 may include at least one central processing unit 102 but may include many processors or processing cores. Computer system 1300 may further include memory 1304 in different forms such as RAM, ROM, hard disk, optical drives, and removable drives that may further include drive controllers and other hardware. Auxiliary storage 1312 may also be include that can be similar to memory 1304 but may be more remotely incorporated such as in a distributed computer system with distributed memory capabilities.

Computer system 1300 may further include at least one output device 1308 such as a display unit, video hardware, or other peripherals (e.g., printer). At least one input device 1306 may also be included in computer system 1300 that may include a pointing device (e.g., mouse), a text input device (e.g., keyboard), or touch screen.

Communications interfaces 1314 also form an important aspect of computer system 1300 especially where computer system 1300 is deployed as a distributed computer system. Computer interfaces 1314 may include LAN network adapters, WAN network adapters, wireless interfaces, Bluetooth interfaces, modems and other networking interfaces as currently available and as may be developed in the future.

Computer system 1300 may further include other components 1316 that may be generally available components as well as specially developed components for implementation of the present invention. Importantly, computer system 1300 incorporates various data buses 1316 that are intended to allow for communication of the various components of computer system 1300. Data buses 1316 include, for example, input/output buses and bus controllers.

Indeed, the present invention is not limited to computer system 1300 as known at the time of the invention. Instead, the present invention is intended to be deployed in future computer systems with more advanced technology that can make use of all aspects of the present invention. It is expected that computer technology will continue to advance but one of ordinary skill in the art will be able to take the present disclosure and implement the described teachings on the more advanced computers or other digital devices such as mobile telephones or "smart" televisions as they become available. Moreover, the present invention may be implemented on one or more distributed computers. Still further, the present invention may be implemented in various types of software languages including C, C++, and others. Also, one of ordinary skill in the art is familiar with compiling software source code into executable software that may be stored in various forms and in various media (e.g., magnetic, optical, solid state, etc.). One of ordinary skill in the art is familiar with the use of computers and software languages and, with an understanding of the present disclosure, will be able to implement the present teachings for use on a wide variety of computers.

The present disclosure provides a detailed explanation of the present invention with detailed explanations that allow one of ordinary skill in the art to implement the present invention into a computerized method. Certain of these and other details are not included in the present disclosure so as not to detract from the teachings presented herein but it is understood that one of ordinary skill in the art would be familiar with such details.

In the present disclosure, the problem of efficiently supporting offset-based updates in column stores is considered. On average, the time taken to insert or delete a tuple at a given offset is linear in the number of tuples of a relation. This is because, in addition to the updated tuple, the storage keys or identifiers of the successive tuples have to be updated as well. In an embodiment of the present invention, offset-based updates on a column store relation can be implemented in time that is sub-linear in the number of tuples and avoids a linear scan of the tuples.

As a first step, issues related to efficiently updating run-length encoded sequences are considered. Subsequently, the teachings of the present invention are generalized to other applications including bitmapped and uncompressed sequences.

Updating Run-Length Encoded Sequences

In an embodiment of the present invention, tuples of a relation in a column store are ordered by sort keys and every attribute is stored separately as a sequence of values. In an embodiment, these sequences are either run-length encoded or bitmap encoded. In an embodiment, bitmapped attributes are compressed using run-length encoding to save space. The run-length encoding scheme compresses successive repetitions of values or runs in a sequence. A run of a value v can be succinctly represented either as a (v, n) or a (v, o) pair, where n is the length of the run and o is the offset of the last (or the first) occurrence of v in the run. For presentation purposes in the present disclosure, the former representation of runs will be called count-based and the latter representation offset-based. The two representation schemes are illustrated using the following example.

EXAMPLE 1

Consider the sequence of values a, a, b, b, b, a, a, a, b, b. If the count-based representation of runs is used to encode this sequence, the result is (a, 2), (b, 3), (a, 3), (b, 2). If he offset-based representation of runs is used, the sequence would be encoded as (a, 2), (b, 5), (a, 8), (b, 10).

Each representation scheme has advantages and disadvantages. Since the offsets of the runs increase monotonically, the offset-based representation of a run-length encoded sequence can be indexed by Binary Search Trees (in memory) or B+ Trees (on disk). Using these indexes, values can be looked up in the sequence based on their offset in time that is logarithmic in the number of runs. But if a run is inserted or deleted, the offset of every successive run must be updated as well. Time taken to update a run-length encoded sequence is linear in the number of runs using the offset-based representation.

In contrast to the offset-based representation, a run can be inserted or deleted using the count-based representation of a run-length encoded sequence in constant time if the offset of updated run is known. But in order to look up a value at a given offset, the offset of the preceding run must be computed as well. The time to look-up a value in a run-length encoded sequence is linear in the number of runs using the count-based representation.

Choosing between the offset-based and the count-based representation of runs trades-off the time taken to look up and update runs of values in a sequence. As part of the present disclosure, it is shown in an embodiment of the present invention that auxiliary data structures can be leveraged along with an appropriate choice of a representation scheme to optimize this trade-off.

The problem of efficiently updating run-length encoded sequences is considered as a first step towards efficiently updating column stores. An embodiment of the present invention includes a novel indexing scheme called count indexes that supports offset-based look ups as well as updates on a run-length encoded sequence with n runs in $O(\log n)$ time. Count indexes according to embodiments of the present invention efficiently trade off the time to look up a value in a sequence with the time taken to update the sequence. The count indexes according to embodiments of the present invention are used in other embodiments to efficiently update bitmap encoded columns and unsorted lists/arrays. Among other things, embodiments of the present invention include procedures to efficiently create count indexes on a sequence of n runs in $O(n)$ time. In embodiments of the present invention, offset-based look ups and updates on count indexes can be performed in $O(\log n)$ time. Also, in embodiments of the present invention, it is shown that a sequence of k runs can be bulk inserted into a count index with n leaf nodes in $O(k+\log n)$ time. Embodiments of the present invention also include count indexes to support $O(\log n)$ updates on bitmap encoded sequences and unsorted lists/arrays of size $O(n)$. In other embodiment, count indexes are adapted to block oriented stores.

Count Indexes

Above, it was shown that choosing a particular representation scheme to run-length encode a sequence trades-off the time to look up a value given its offset and the time to update the sequence. An indexing scheme will now be disclosed that optimizes this trade-off. To facilitate the present disclosure, an indexing scheme according to embodiments of the present invention will be discussed as count indexes. In certain embodiments of the present invention, count indexes can be understood as a binary tree on a sequence of integers. In an embodiment of the present invention, the integers are stored in the leaf nodes of the binary tree. In an embodiment, every interior node in the count index stores the sum of its children's values. The root of the count index stores the total sum of integers in the sequence.

Figure 1:
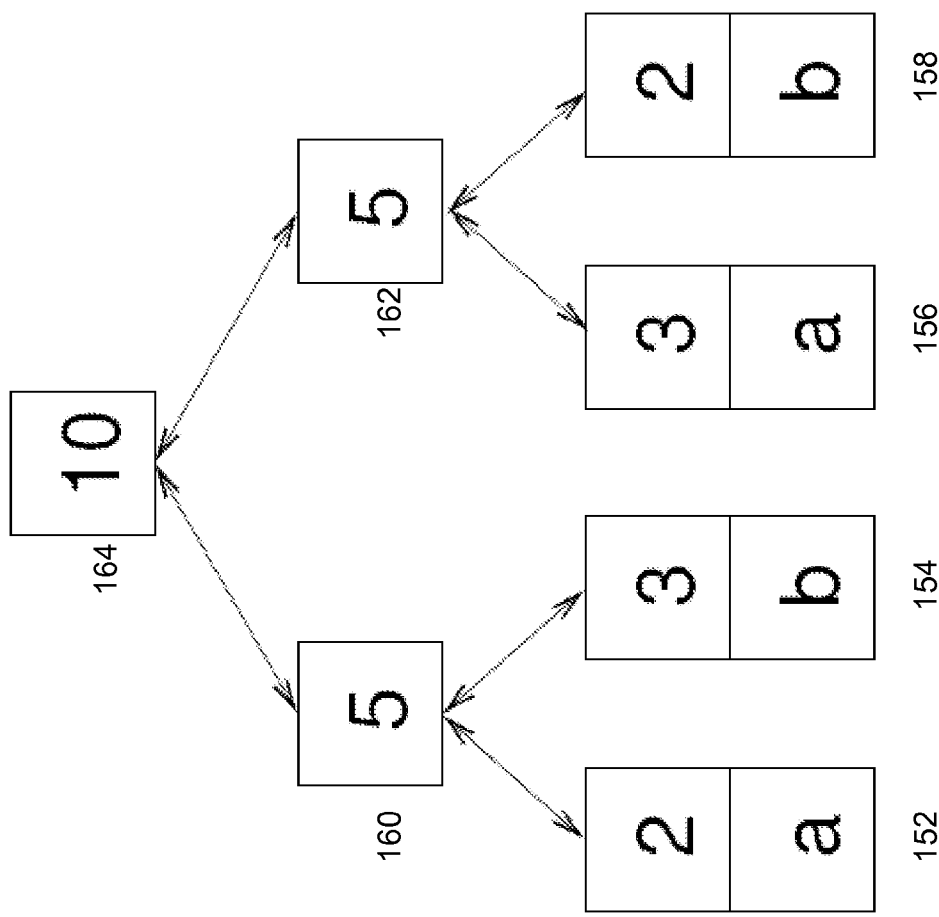
FIG. 1 is an illustration of a count index according to an embodiment of the present invention.

Shown in FIG. 1 is a count index on the sequence given in Example 1 (a, a, b, b, b, a, a, a, b, b). While the count index is constructed on the run lengths only, the values (a and b) are displayed as well for presentation purposes. As shown in FIG. 1, leaf node 152 represents the first two occurrences of a, leaf node 154 represents the next three occurrences of b, leaf node 156 represents the next three occurrences of a, and leaf node 158 represents the next two occurrences of b. Node 160 stores the number of values (=5) in leaf nodes 152 and 154, node 162 stores the number of values (=5) in leaf nodes 156 and 158. The root node 164 in FIG. 1 stores the number of values in the sequence (=10).

Given a run-length encoded sequence with n runs, lookup or run updates of values can be performed at specified offsets using count indexes in $O(\log n)$ time. To be discussed below are exemplary algorithms according to embodiments of the present invention for index creation, lookup, and maintenance.

Index Creation

As discussed above, a count index according to embodiments of the present invention is a binary tree on a sequence of integers. In embodiments of the present invention, every node in a count index stores the sum of the values of its children. To construct a count index on a sequence of n integers, the integers are divided into groups of two. If n is odd, a group is created for the last count. The sum of the counts of the integers is then computed in each of the $$\lceil \frac{n}{2} \rceil$$

groups and the count index is recursively built on these $$\lceil \frac{n}{2} \rceil$$

sums. An algorithm according to an embodiment of the present invention is presented in FIG. 2. As indicated in FIG. 2, the pointers to the parent, left and the right children of a node are stored in parent, lchild and rchild, respectively.

In an embodiment of the present invention, groupings of two nodes are implemented. The teachings of the present invention, however, are broader. Accordingly, in other embodiment of the present invention, groupings of four and eight are implemented. Still other embodiments can implement groupings of different numbers of nodes. The teachings of the present invention extend to all such implementations as would be understood by one of ordinary skill upon understanding the present disclosure including the appended figures and claims.

Time Complexity:

According to an embodiment of the present invention, in a first pass, n integers are divided into groups of two and the sum of the integers in each group is computed. In an embodiment, this takes n units of time. The second pass takes $$\lceil \frac{n}{2} \rceil$$

units of time, the third pass takes $$\lceil \frac{n}{2} \rceil$$

units of time and so on. The algorithm terminates after log n passes. The time complexity of the index creation algorithm is therefore $O(n+n/2+n/4+ \ldots +1)=O(2\times n)=O(n)$.

Above, it was observed that choosing one representation of a run-length encoded sequence over the other trades off the time taken to update the sequence with the time taken to look up values given their offsets. In an embodiment, the count indexes according to an embodiment of the present invention optimizes this trade-off by supporting O(log n) offset based look ups and updates on a sequence with n runs.

Index Look Up

The run lengths in a run-length encoded sequence are not monotonic in general. Therefore, a binary search cannot be directly performed on the run lengths to look up the leaf node corresponding to a given offset. But if by starting at the root of the count index, which of its children contains the leaf node corresponding to the given offset in constant time can be determined. Suppose a look up the value at offset p is desired. Let the counts of the left child and the right child of the root be $l_v$ and $r_v$, respectively. If $p \leq l_v$, the value at offset p is located in the left child of the root. Otherwise, the value at offset p is located in the right child. The left or the right child of the root can now be looked up in a similar manner. The lookup procedure terminates when the algorithm arrives at a leaf that corresponds to the supplied offset. The look up procedure terminates in time that is proportional to the height of the count index. An algorithm according to an embodiment of the present invention for looking up values in a count index is presented in FIG. 3.

Figure 4:
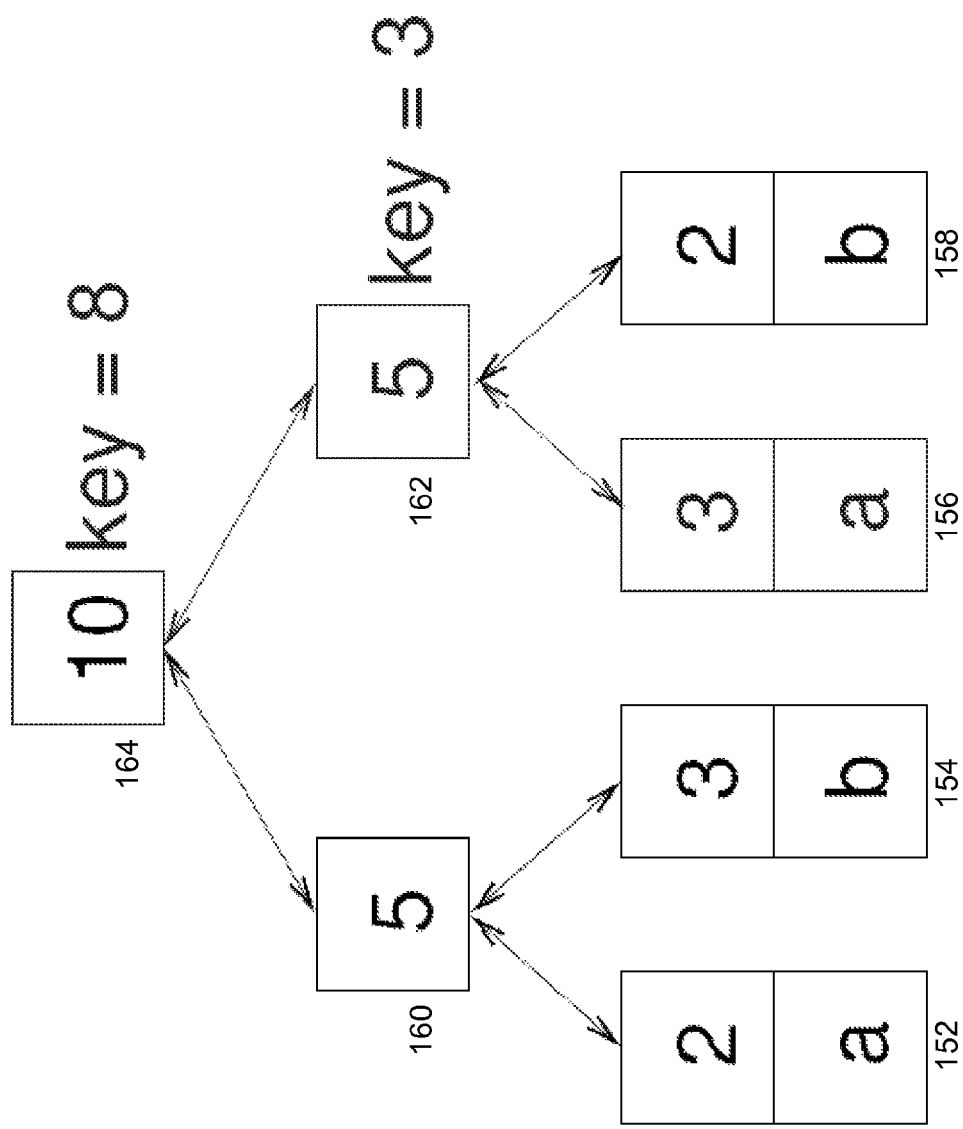
FIG. 4 is an illustration of a lookup on a count index according to an embodiment of the present invention.

To illustrate how the look-up algorithm works according to an embodiment of the present invention, the count index (FIG. 1) on the sequence given in Example 1 is revisited. Suppose that with reference to FIG. 4 a look-up the value at the 8th position from the start of the sequence is desired (see block 164 of FIG. 4). The counts of the left and right children of the root of the count index are looked up (see nodes 160 and 162, respectively). Since the count of the left child (node 160=5) is less than 8, the value at offset 3 (=8−5) in the right child (node 162) of the root is looked up. Since the count of the left child is 3 (see leaf node 156), the look up procedure terminates and returns the value a.

Proof of Correctness:

The correctness of the lookup algorithm shown in FIG. 3 can be shown using induction on the height of the count index.

Base Case:

(Index with a root and 2 children, e.g., height=2) Suppose the value in the p-th position from the start of the sequence is desired to be looked up. Let $l_v$ and $r_v$ be the counts of the left and right children of the root node. If the offset is positive and less than the size of the sequence:

$$1 \leq p \leq l_v + r_v \quad (1)$$

Therefore, either $p \leq l_v$ or $p - l_v \leq r_v$.

Inductive Hypothesis:

The look up algorithm is assumed to correctly return the value at any given offset in a count index of height $\leq k$.

Induction Step:

Suppose the value at the offset p in a count index of height k+1 is looked up. Let $l_v$ and $r_v$ be the counts of the left and right children of the root node. Following the argument made in the base case, either $p \leq l_v$ or $p - l_v \leq r_v$. Since the children of the root node at a height of k, the look up algorithm correctly returns the value at the offset p.

Time Complexity:

Consider a count index on a sequence of n integers. The algorithm in FIG. 3 according to an embodiment of the present invention examines one node at any level in the count index. Since the height of the count index is log n, the time complexity of the look up procedure is O(log n).

Supporting Range Predicates:

Given a count index with n leaves, values within a given range of offsets in O(log n) time can be looked up by creating links between the neighboring leaf nodes. Suppose values within the offsets p and q from the start ($p \leq q$) are required. The value at offset p is looked up using the algorithm shown in FIG. 3 according to an embodiment of the present invention. On reaching the leaf node that corresponds to the offset p, the leaf's neighbors are traversed on the right until the leaf node corresponding to the offset q is reached.

Index Maintenance

It is essential for any index to be efficiently updatable when new values are inserted or old values are deleted. When values in a sequence are updated, the corresponding count index is affected in one of the following ways:

1. The count of an existing leaf node is updated.
2. A new leaf node is inserted or an existing leaf node is deleted from the count index.

Case 1 is handled by updating the ancestors of the leaf node in time that is logarithmic in the number of runs in the sequence. Case 2 can potentially unbalance the count index. Since the counts of the leaf nodes are not monotonic, tree rotation schemes that are used to balance AVL trees or Red-Black trees cannot be used here. To be discussed now are techniques to efficiently balance a count index when new values are inserted or old values are deleted. Note that in all of the examples which follow, inserts and deletes of single values or counts into a count index are discussed. The index update procedures described below can, however, be used to insert or delete runs of any length ($\geq 1$).

Deletions:

Suppose a leaf is desired to be deleted from a count index. There are two cases depending on whether the leaf has a sibling or not.

1. (Leaf has no siblings): In this case, the leaf and its ancestors are deleted. If the new root has only one child, its child is set to be the root. Iteration proceeds down the tree.
2. (Leaf has a sibling): In this case, the leaf (say $c_l$) or its sibling (say $c_s$) are checked to determine whether they have a neighbor without any sibling of its own. If neither the leaf nor its sibling have such a neighbor, then the leaf node is deleted. The value at its parent is then updated. Otherwise, let $c_n$ denote the neighbor of the leaf (or its sibling) that has no sibling of its own. The leaf $c_l$ is deleted and the neighbor $c_n$ is assigned to be the sibling of $c_s$.

Figure 5:
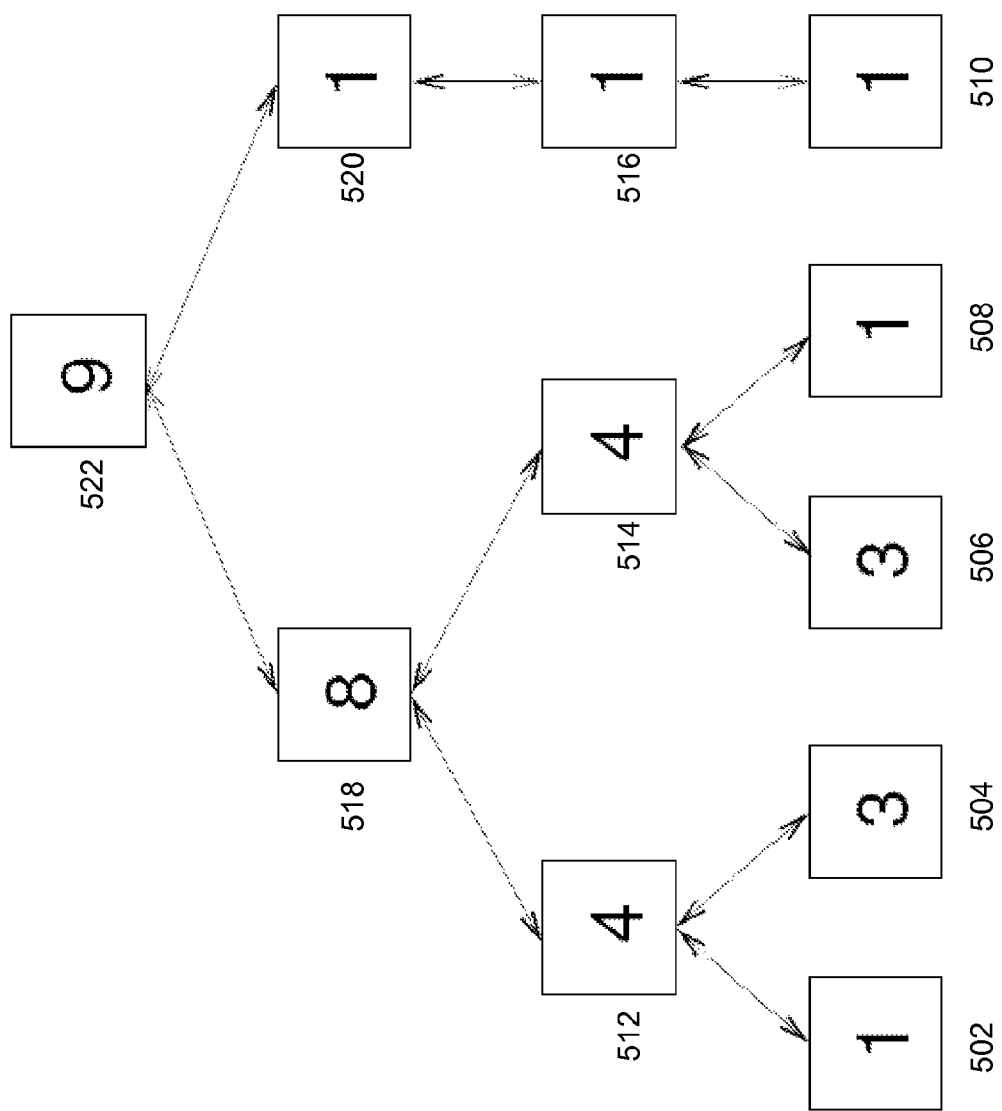
FIG. 5 is an illustration of a count index on a sequence with five run-lengths according to an embodiment of the present invention.

As shown in FIG. 5, consider a count index on a sequence with five run-lengths: 1 (node 502), 3 (node 504), 3 (node 506), 1 (node 508), and 1 (node 510). Note that although the count index appears to be unbalanced, its height is in fact $\leq \log_2(\#\text{nodes}=5)$. In an embodiment of the present invention, this is always the case for Assertion 3. Suppose it is desired to delete the right-most count from the count index shown in FIG. 5. Since the leaf node (node 510) corresponding to the rightmost count (=1) does not have a sibling, it is deleted as well as all its ancestors (nodes 510, 516, 520 shown as hatched nodes in FIG. 6(a)). Shown in FIG. 6(b) is the state of the count index (see node 518 in FIG. 6b) after deleting its rightmost leaf.

Figure 6A:
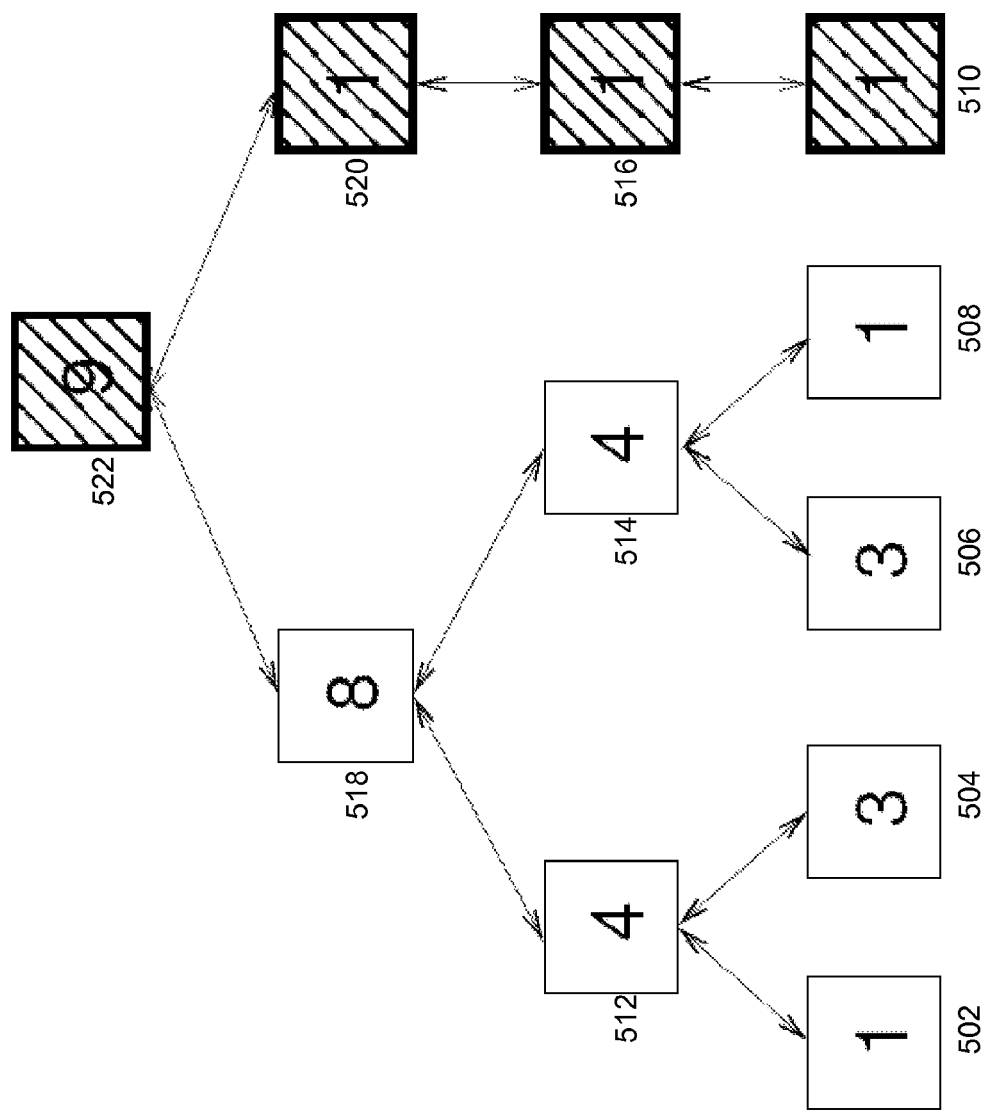
FIGS. 6a-c are illustrations of deleting a leaf that has no siblings according to an embodiment of the present invention.
Figure 6B:
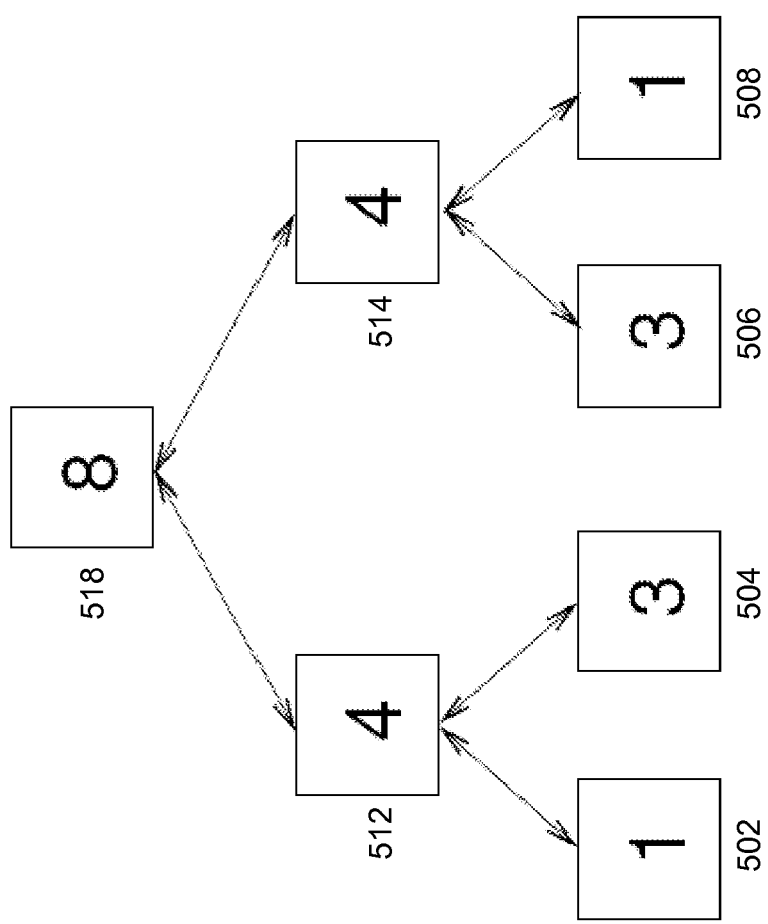
Figure 6C:
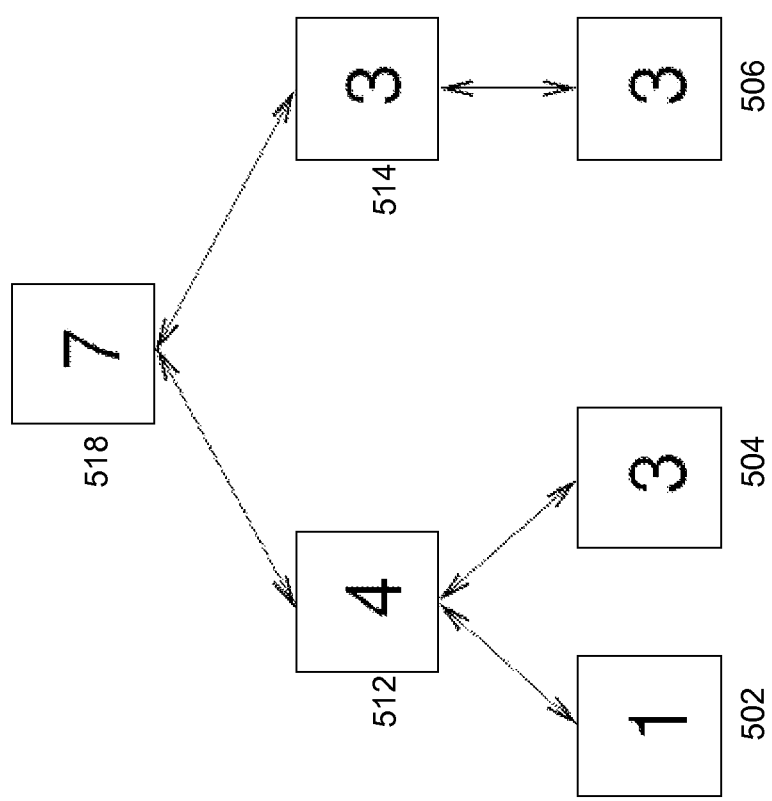

Suppose that the rightmost leaf of FIG. 6(b) is again deleted (e.g., node 508). Since the rightmost leaf 508 of FIG. 6(b) has a sibling node 506 and no neighbors without a sibling, the leaf node 508 is deleted and the value of its parent 514 is updated. The resulting count index is shown in FIG. 6(c).

Figure 7A:
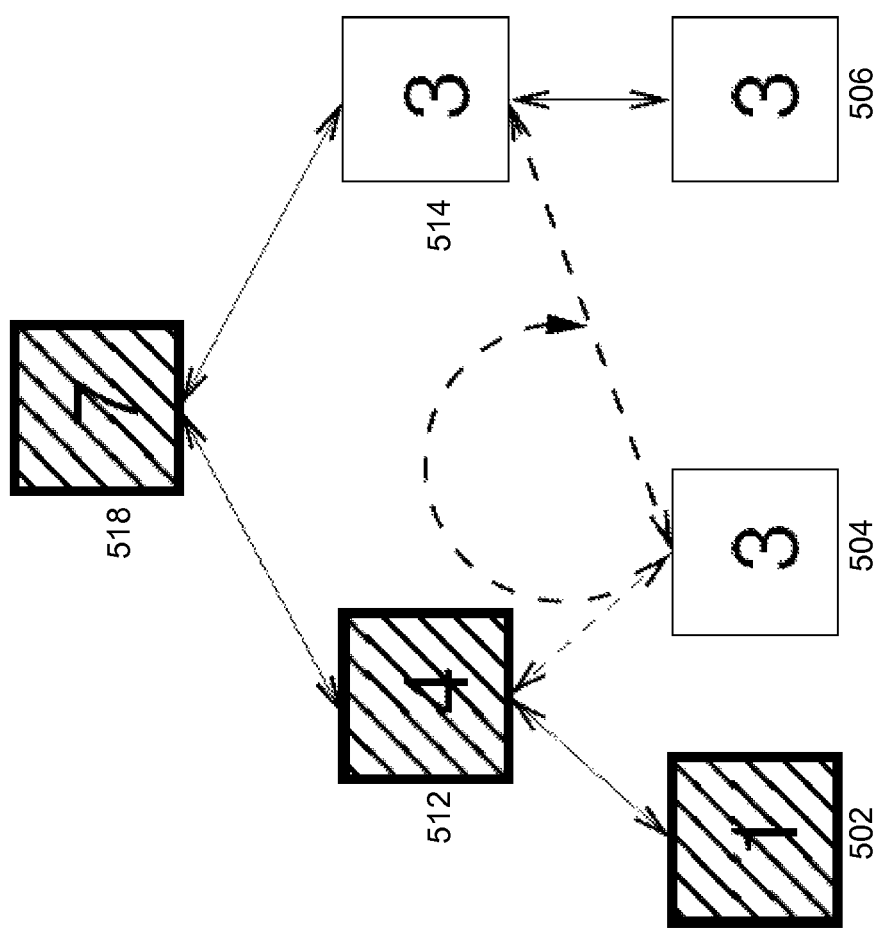
FIGS. 7a-b are illustrations of deleting a leaf that has a sibling according to an embodiment of the present invention.
Figure 7B:
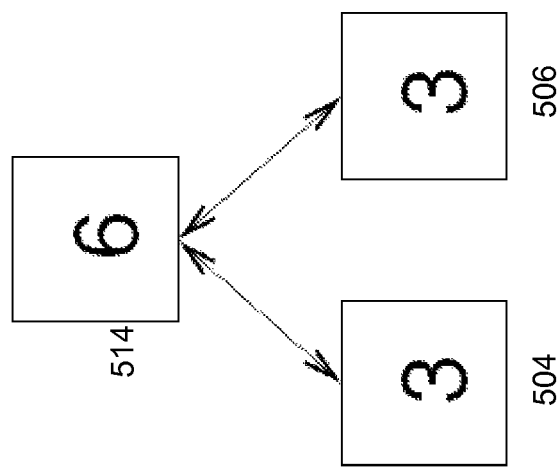

With reference to FIG. 7(a), now suppose the leftmost node 502 with count=1 is deleted. Since the leftmost leaf 502 has a sibling 504 with a count of 3 and a neighbor 506 without any siblings, the leftmost node 502 is deleted and the sibling 504 is paired with the neighboring leaf 506. This procedure is shown in FIGS. 7(a) and (b). The resulting count index is shown in FIG. 7(b).

Assertion 1.

Deleting a leaf from a count index takes time that is linear in the height of the count index.

Proof.

Let $f(k)$ and $g(k)$ be the time taken to delete a node at a height of k using cases 1 and 2, respectively. Then, the following recurrence relations hold.

$$f(k) \leq 1 + \max\{(f(k-1), g(k-1)\} \quad (2)$$

$$g(k) = f(k-1) \quad (3)$$

On solving for $f(k)$ and $g(k)$, $f(k)=g(k)=c \times k+d$ is obtained where c and d are constants. Therefore, a leaf can be deleted from a count index of height h in O(h) time.

Updating the Root:

When a leaf node is deleted that causes one of the root's children to be deleted as well (an example is shown in FIG. 6(a)), the root node of the count index has to be updated. Generally, after the deletion procedure terminates, the root of the count index is checked to determine whether it has two children or not. If the root has two children, no further updates are required. But if the root of the count index has only one child, its child is set to be the new root node. Recursion is performed down the count index.

Inserts:

In an embodiment of the present invention, the process of inserting leaves into a count index is similar to deleting leaves. Suppose it is desired to insert a leaf node w between two leaves, u and v. In an embodiment, there are two cases depending on whether u or v have siblings or not.

1. (One of u or v has no siblings): Without loss of generality, it can be assumed that u has no sibling. Leaf node w is made the sibling of leaf node u. The count at their parent is then updated in an embodiment.
2. (Both u and v have siblings): If u and v are siblings of each other, then leaf node w is made the sibling of leaf node u by updating the count at v. Next, a leaf with the same count as v is inserted into the count index. If u and v are not siblings, then a new node is created for w at the leaf level, and its parent is set to have the same count as itself.

Assertion 2. Inserting a leaf into a count index takes time that is linear in the height of the count index.

Proof. Let $f(k)$ and $g(k)$ be the time taken to insert a node at a height of k using cases 1 and 2 respectively. Then, the following recurrence relations hold in an embodiment of the present invention.

$$f(k) = f(k-1) + 1 \quad (4)$$

$$g(k) \leq 1 + \max\{(f(k-1), g(k-1)\} \quad (5)$$

On solving for $f(k)$ and $g(k)$, $f(k)=g(k)=c \times k+d$ is obtained where c and d are constants. Therefore, in an embodiment of the present invention, a leaf can be inserted into a count index of height h in O(h) time.

Balancing Count Indexes:

Using Assertions 1 and 2, it has been established that node insertions and deletions in a count index of height h take O(h) time. It still needs to be show that an updated count index is balanced, e.g., h=O(log n).

Count indexes can be potentially unbalanced due to nodes which are not paired with their neighbors. Such unpaired nodes are called holes in an embodiment of the present invention. Since a node in a count index stores the sum of the children's counts, traditional tree rotation techniques for tree balancing as is used in Red Black Trees (L. J. Guibas et al. A dichromatic framework for balanced trees. 1978) or AVL Trees (see e.g., Avl trees. http://en.wikipedia.org/wiki/AVL_tree) cannot be used.

Consider a count index with n leaf nodes. The maximum number of holes at the leaf level of the count index is $$\left\lceil \frac{n}{2} \right\rceil.$$

When a node is inserted into or deleted from the count index, holes are propagated onto higher levels where they are either pair with an existing hole or cause a node to be split (while inserting a node) or two nodes to be merged (while deleting a node).

Figure 8:
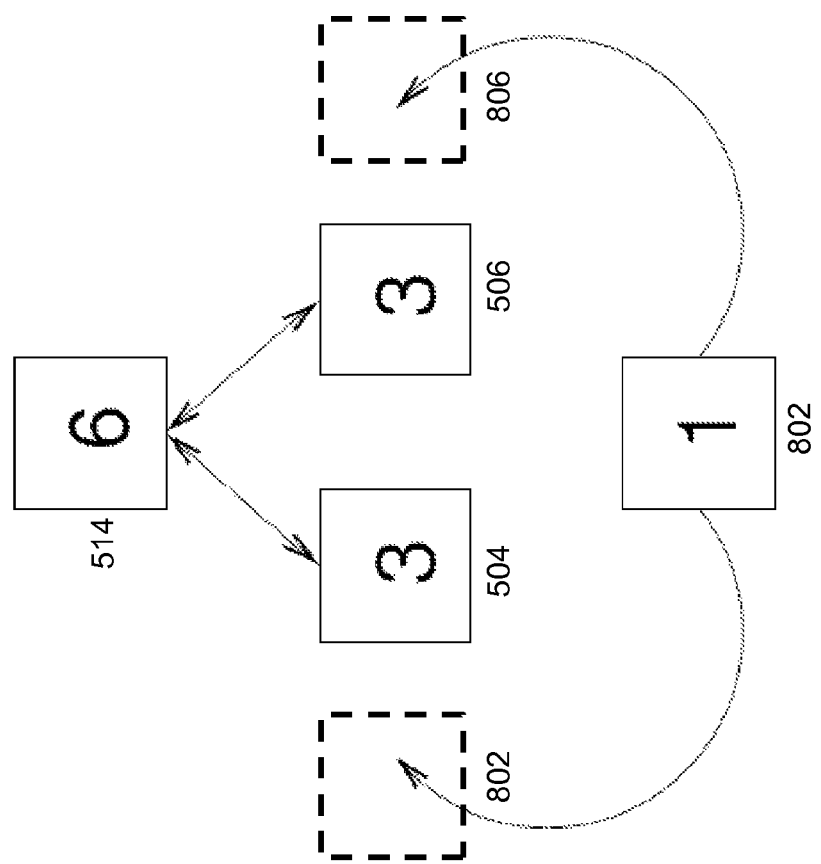
FIG. 8 is an illustration of inserting counts at a "hole" position according to an embodiment of the present invention.
Figure 9:
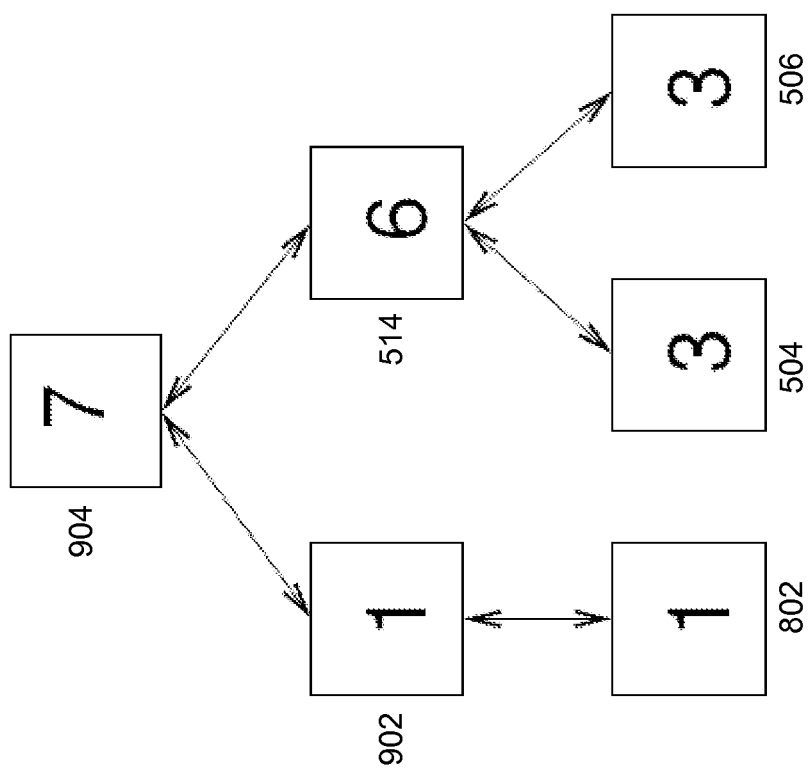
FIG. 9 is an illustration of a state of a count index after insertion according to an embodiment of the present invention.

With reference to FIG. 8, the count index previously being considered has two hole positions 804 and 806 (recall nodes 502 and 508 that were deleted from FIG. 6(a)) at the leaf level. When a count (see node 802) is inserted (say 1) into either of these holes, the hole propagates to the next level and pairs with the node which was previously the root. For example as shown in FIG. 9, a count (=1) is inserted into hole 804, the hole propagates to node 902 and pairs with node 514 which was previously the root node to create new root node 904 having a count of 7 (=1+6).

Assertion 3.

The height of a count index with n leaves is O(log n), e.g., the count index is balanced.

Proof. Suppose that there are n nodes paired up at the leaf level in a count index. The maximum number of holes at a leaf level is $$\left\lfloor \frac{n}{2} \right\rfloor.$$

At subsequent levels, the maximum number of holes is $$\left\lfloor \frac{n}{4} \right\rfloor, \left\lfloor \frac{n}{8} \right\rfloor, \left\lfloor \frac{n}{16} \right\rfloor,$$

and so on. Hence, at every at every level of the count index, at most one-third of the nodes can potentially be holes. The height of the count index is thus log (3×n/2)=O log(n).

A count index can, therefore, be updated in time that is logarithmic in the number of runs in a sequence. Better performance can be achieved when inserting a sequence of runs into the input sequence.

Bulk Inserting Sequences:

Consider a count index with n leaf nodes. Suppose it is desired to insert a sequence of k runs. The k runs could be inserted using the insert procedure described above in O(k×log (n+k)) time. But better performance can be achieved in an embodiment of the present invention if use is made of the fact that the k runs are adjacent. An algorithm according to an embodiment of the present invention is presented below that efficiently inserts a sequence of k runs (represented as $[c_i]$) into a count index T with n leaves.

Construct a count index T' on the sequence $[c_i]$.

Figure 10:
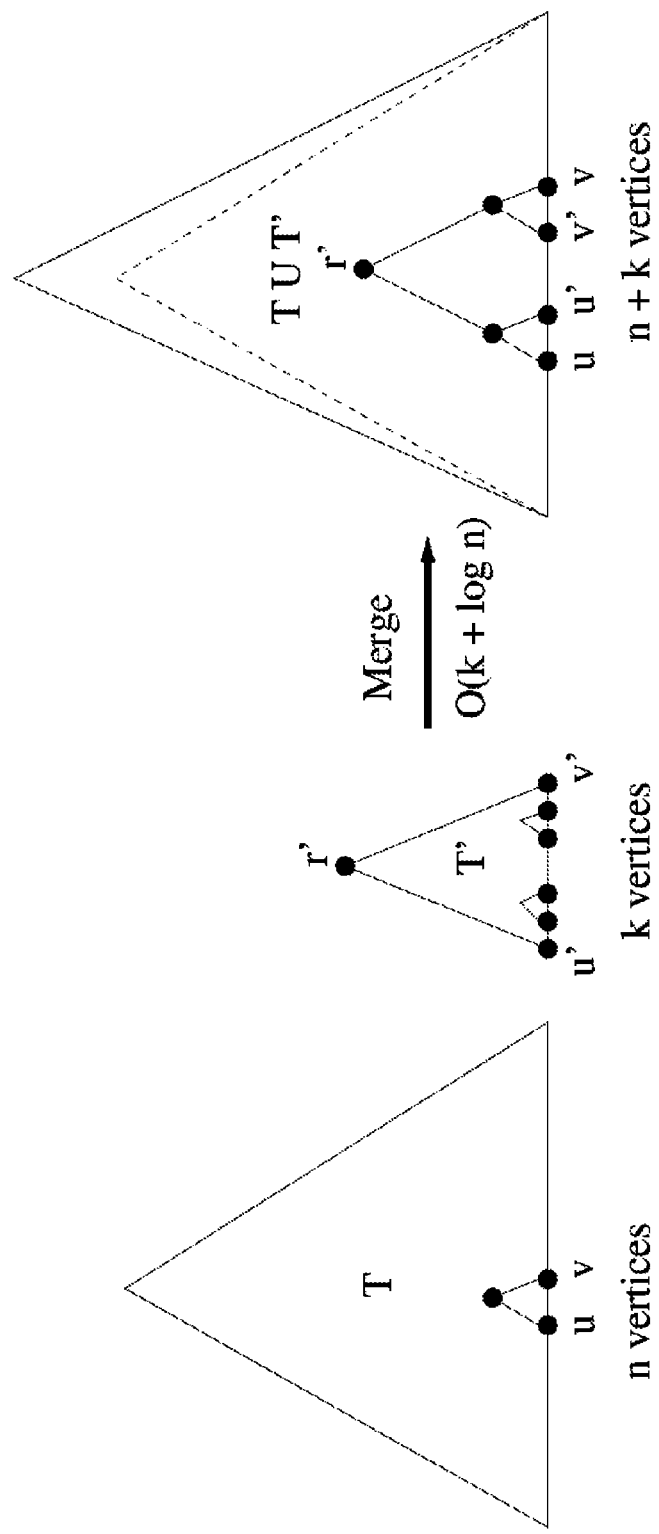
FIG. 10 is an illustration of bulk inserting a sequence of runs into a count index according to an embodiment of the present invention.

Merge T and T' (see FIG. 10).

Let u and v be the leaves in T between which the sequence $[c_i]$ is inserted. Either of u or v could be null.

If u and v are siblings, split u and v, converting them into holes.

Pair up the left-most leaf in T' and u if both nodes are holes.

Similarly pair up the right-most leaf of T' and v if both nodes are holes.

Insert the rest of the leaves of T' into T without further modifications.

Iterate at the next higher level of T' and T.

At a height of log k, insert the root of T' into T.

Time Complexity:

Constructing T' takes O(k) time. Inserting the root of T' into T at a height of log k takes O(log n/k) time. To bound the time taken to merge two count indexes with n and k leaves, denote it as the function $f(n, k)$. The algorithm described above results in the following recurrence relations.

$$f(n, k) = f\left(\frac{n}{2}, \frac{k}{2}\right) + O(k) \quad (6)$$

$$f(n, 1) = O(\log n) \quad (7)$$

On solving for $f(n, k)$, $f(n, k) = O(k + \log n)$ is obtained. Using the above algorithm according to an embodiment of the present invention, a sequence of k runs can be inserted contiguously in time that is almost linear in k.

Optimality of Incremental Maintenance Using Count Indexes

Above, it was shown that count indexes can be leveraged to support O(log n) offset-based look ups and in-place inserts, deletes and updates of runs into a run-length encoded sequence with n runs. A lower bound result of the complexity of incrementally maintaining partial sums is now used to show that the problem of incrementally maintaining a run-length encoded sequence with n runs requires O(log n) time. Given an array $\{a[i]\}$ and a parameter k, the partial sums problem computes $\Sigma_{i=0}^{k} a[i]$ subject to updates of the form a[i]+=x. Others have independently established that incrementally maintaining partial sums while supporting in-place updates requires O(log n) time.

The problem of incrementally maintaining partial sums over an array $\{a[i]\}$ of length n can be reduced to the problem of incrementally maintaining run-length encoded sequences. A run-length encoded sequence with n runs is created. Every i corresponds to a run and the run-length of the $i^{th}$ run is equal to a[i]. An update a[i]+=x to the partial sums problem is equivalent to an insertion of x runs at the offset $\Sigma_{j=0}^{i} a[i]$ in the run-length encoded sequence. The computation of the partial sum at a[k] is equivalent to the computation of the starting offset of the $i+1^{th}$ run. Therefore, incrementally maintaining a run-length encoded sequence with n runs requires O(log n) time. The problem of incrementally maintaining run-length encoded sequences is more general than the problem of incrementally maintaining partial sums because the partial sums problem does not support in-place insertion or deletion of array elements. By leveraging count indexes, offset-based look ups and in-place inserts, deletes and updates can be supported in a run-length encoded sequence with n runs in O(log n) time which is preferred in an embodiment of the present invention.

Extensions

Above, it was shown that count indexes can efficiently lookup and update a run-length sequence with n runs in O(log n) time. Bitmap encoding is another compression technique that is used in columnar databases to compress columns with a few distinct values. Bitmaps are generally sparse and are further compressed using run-length encoding. In an embodiment of the present invention to be described now, count indexes are extended to efficiently update bitmap encoded sequences as well. The problem of efficiently looking up and updating unsorted lists/arrays is also considered. It will be shown that indexes can be used to support logarithmic updates and lookups. To be disclosed also is the manner in which count indexes can be generalized to block oriented stores where the number of I/Os determine the time complexity of updates.

Updating Bitmap Encoded Sequences: Bitmap encoding a sequence creates a bit-vector for every distinct value in the sequence. If the sequence contains the value v at the $i^{th}$ position, then the bit-vector corresponding to the value v contains the bit 1 at the $i^{th}$ position. Bitmaps are sparse and are compressed using run-length encoding. When new values are added to the sequence, additional bits are appended to the end of the bitmaps. When values are deleted from a bitmap, the corresponding bits are not deleted. Instead, the deleted values are tombstoned (see H. Garcia-Molina et al. Database Systems: The Complete Book. 2008). If a new value is inserted or delete an existing value at a given offset in the bitmap, it takes time that is linear in the size of the bitmap. The update complexity can be significantly improved by extending count indexes to operate on bit-mapped sequences. For every distinct value in an input sequence, a count index on the corresponding run-length encoded bitmap is created. The bitmap can now be looked up and updated at a given offset in time that is logarithmic in number of the runs in the bitmap. An example according to an embodiment of the present invention is presented to show how count indexes can be extended to operate on bitmapped sequences.

EXAMPLE 2

Figure 11:
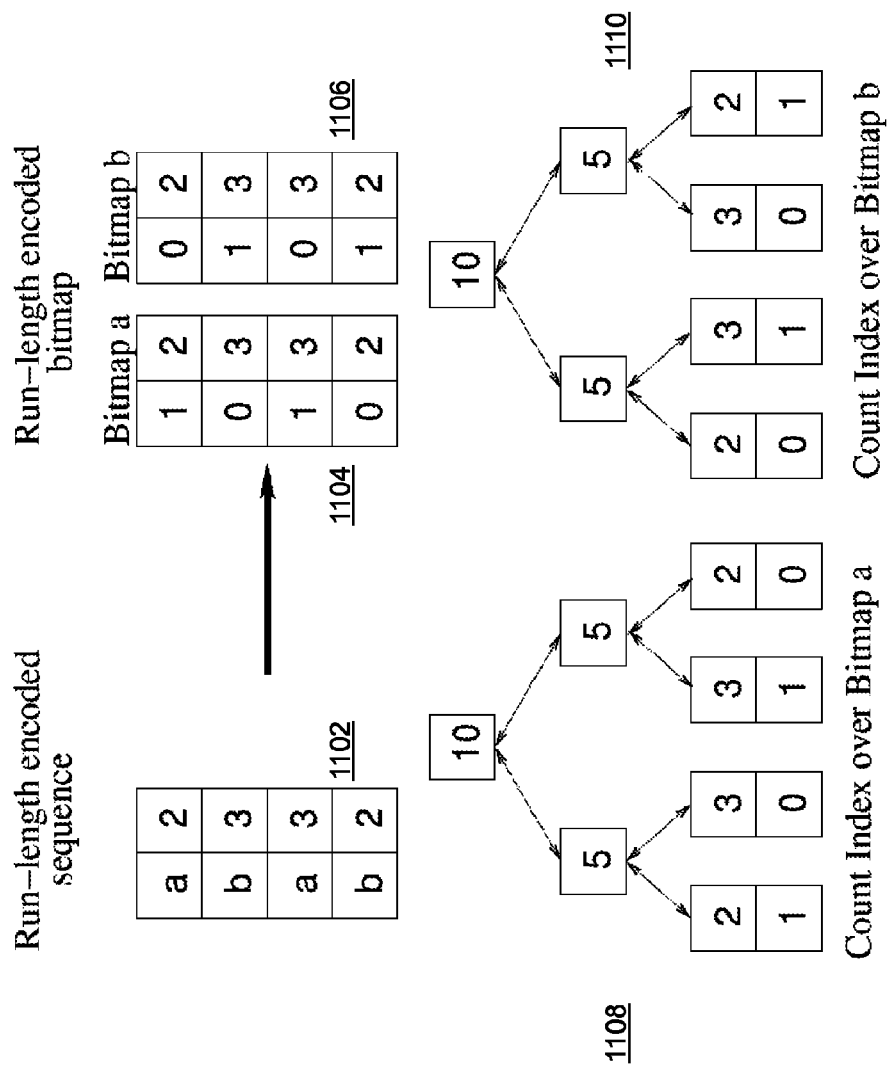
FIG. 11 is an illustration of count indexes on run-length encoded bitmaps according to an embodiment of the present invention.

With reference to FIG. 11, suppose the sequence is bitmap encoded as given in Example 1 (see block 1102). Two bitmaps are obtained: [1 1 0 0 0 1 1 1 0 0] (see block 1104) for the value 'a' and [0 0 1 1 1 0 0 0 1 1] (see block 1106) for 'b.' Run-length encoding these bitmaps would produce the following sequences: [(1, 2) (0, 3) (1, 3) (0, 2)] as shown in tree 1108 and [(0, 2), (1, 3), (0, 3) (1, 2)] as shown in tree 1110, respectively. Two count indexes are constructed on the resulting sequences (see tree 1108 and tree 1110). Note that these indexes are identical to each other.

In general, if an input sequence has n runs and k distinct values, then the bitmapped sequence could be looked up and updated using count indexes in time that is proportional to k×log n/k in the worst case. The bitmaps are, however, independent of each other. Hence, the look up and update algorithms for the k bitmaps can be executed in parallel in O(log n) time.

Updating Uncompressed Sequences:

Count indexes efficiently update run-length encoded sequences. They can, however, be extended to operate on unsorted lists/arrays as well according to an embodiment of the present invention. The values in the array are run-length encoded, and the count index is subsequently constructed on the run lengths. If an array has N values and n runs, then offset-based look-ups and updates can be performed on the array in time that is proportional to log n. Count indexes can thus be used to look up and update unsorted lists or arrays in time that is logarithmic in the array size.

Adapting to Block-Oriented Stores:

Count indexes to disk can be extended by increasing the fanout of every node in a count index in a manner similar to B+ trees. In an embodiment of the present invention, this index structure is called a count+ index. The size of a node of the count+ index is assigned to be equal to the size of a page on disk. If the size of a page on disk is S bytes and every value in the sequence is W bytes long, then the maximum number (e.g., k) of counts that can be stored at an interior node and a leaf node of a count+ index is given by $$\sqrt{\frac{S-4}{12}} \text{ and } \sqrt{\frac{S-4}{W+4}},$$

respectively. Every interior node maintains the sum of its children's counts as well as the pointers to its children. Every node except for the root must have at least [k/2] counts. In an embodiment of the present invention, the algorithms to update a count+ index when counts are inserted or deleted are substantially similar to the respective algorithms for count indexes with the following exceptions:
1. When a value or a count is inserted to a node of a count+ index that is full, e.g., has k counts, a new node is created and half of the counts/values are moved to the newly created node.
2. When a value or a count is deleted from a non-root node of the count+index that has exactly [k/2] counts, two possible cases arise:
   (a) There is a neighboring node which has at least [k/2]+1 counts. In this case, the node is updated by moving either the rightmost count (if the neighbor is on the left) or the leftmost count (if the neighbor is on the right) from the neighboring node.
   (b) All the neighboring nodes have [k/2] counts. In this case, any of the neighbors can be selected, the counts of the node and its neighbor can be merged, and the sum of the resulting node can be updated.

Methods according to embodiments of the present invention were disclosed where a single run count in each leaf node of a count index was stored as well as the sum of two child nodes in their parent. In order to adapt count indexes to block-oriented stores where each block of data is a disk page instead of a single value, for example, another embodiment of the present invention includes modified count indexes to store multiple counts in each node.

For example, suppose each disk page is S bytes long and the width of the attribute to be stored is W bytes long. In an embodiment, the run-lengths can be represented as 4 byte integers. In each leaf node of the modified count index, a maximum of $N_l$ attribute values, their respective counts and the sum of their $N_l$ counts are stored where $$N_l = \frac{S-4}{W-4}.$$

In each interior node, a maximum of $N_i$ pointers (8 Bytes long) are stored to its children as well as the sum of their respective counts (4 Bytes each) where $$N_i = \frac{S-4}{W+12}.$$

To adapt count indexes to block-oriented stores, we also establish a new index invariant: every non-root node is at least half-full, e.g., every leaf node stores at least $$\left\lceil \frac{N_l}{2} \right\rceil$$

attribute values and counts and every interior nodes stores at least $$\left\lceil \frac{N_i}{2} \right\rceil$$

pointers to its children. The modified algorithms for inserting and deleting a run are presented in FIGS. 14a and b, respectively.

CONCLUSION

The present disclosure has described embodiment of the present invention that, among other things, implement and indexing scheme that supports offset-based lookups and updates on a run-length encoded sequence. Count indexes according to embodiments of the present invention significantly reduce the time complexity of offset-based updates on run-length encoded columns from O(n) to O(log n). Count indexes can be generalized to operate on bitmap encoded sequences as well as uncompressed sequences according to other embodiments of the present invention.

Columnar databases compress attribute values using run length encoding and bitmap encoding. In other embodiments of the present invention, count indexes can be leveraged as an auxiliary data structure to efficiently support single value updates in column store relations. In other embodiments, count indexes can bulk insert a sequence of values in time that is almost linear in the number of inserted runs, amortizing the time to insert values in bulk.

The performance of count indexes according to certain embodiments of the present invention are shown in Table 1 (FIG. 12).

It should be appreciated by those skilled in the art that the specific embodiments disclosed above may be readily utilized as a basis for modifying or designing other image processing algorithms or systems. It should also be appreciated by those skilled in the art that such modifications do not depart from the scope of the invention as set forth in the appended claims.

What is claimed is:
1. A computer-implemented method for performing database storage management, comprising:
   encoding a first sequence of information comprising a compression of at least one successive repetition of values in the first sequence of information;
   calculating a maximum number of child nodes based on a number of groups to group the encoded first sequence of information;
   grouping the encoded first sequence of information into sets of leaf nodes, each set having a number of leaf nodes that are no more than the calculated maximum number of child nodes, wherein each leaf node includes an identification of a repeated value and a count of the repetition of the repeated value; and
   generating at least one hierarchical node from the sets of leaf nodes wherein each of the hierarchical node at each level of hierarchy has a number of child nodes that are no more than the calculated maximum number of child nodes and maintains a sum of the count of the repetition of the repeated value of each descendant leaf node of the hierarchical node; and generating a count index for the encoded first sequence of information based on the sets of leaf nodes and the hierarchical nodes by:
    for each piece of information in the encoded sequence of information:
        determining a first index location based on the number of groups, where the index location corresponds to a first hierarchical node;
        setting the first hierarchical node as the parent node;
        creating a pointer defining a relationship between the parent node and at least one leaf node, where the number of leaf nodes corresponds to the maximum number of child nodes for the first hierarchical node, thereby creating a subgroup of related leaf nodes within the sets of leaf nodes; and
        updating the first index location to correspond to the next hierarchical node in the at least one hierarchical node in the set of leaf nodes; and
    recursively generating the count index for each subgroup of related leaf nodes.

2. The method of claim 1, further comprising looking up at least one item of the first sequence of information by traversing the at least one hierarchical node.

3. The method of claim 2, wherein looking up at least one item of the first sequence of information includes the steps of
    receiving position information for the at least one item of information;
    determining branches of the at least one hierarchical node corresponding to the position information;
    determining a node of the lowest level of hierarchy corresponding to the at least one item of the first sequence of information.

4. The method of claim 3, wherein the position information includes offset information.

5. The method of claim 3, wherein looking up the at least one item of the first sequence of information is performed in O(log n) computation steps where n is the number of items of information in the first sequence of information.

6. The method of claim 1, further comprising making at least one change to at least one leaf node.

7. The method of claim 6, wherein the at least one change includes changing at least one count of the repetition of the repeated value.

8. The method of claim 6, wherein the at least one change includes inserting at least one new leaf node.

9. The method of claim 6; wherein the at least one change includes deleting at least one leaf node.

10. The method of claim 1, wherein the maximum number of child nodes is based on the number of sequences in the encoded first sequence of information.

11. A non-transitory computer-readable medium including instructions that, when executed by a processing unit, cause the processing unit to perform database storage management, by performing the steps of:
    encoding a first sequence of information comprising a compression of at least one successive repetition of values in the first sequence of information;
    calculating a maximum number of child nodes based on a number of groups to group the encoded first sequence of information;
    grouping the encoded first sequence of information into sets of leaf nodes, each set having a number of leaf nodes that are no more than the calculated maximum number of child nodes, wherein each leaf node includes an identification of a repeated value and a count of the repetition of the repeated value; and
    generating at least one hierarchical node from the sets of leaf nodes wherein each of the hierarchical node at each level of hierarchy has a number of child nodes that are no more than the calculated maximum number of child nodes and maintains a sum of the count of the repetition of the repeated value of each descendant leaf node of the hierarchical node; and
    generating a count index for the encoded first sequence of information based on the sets of leaf nodes and the hierarchical nodes by:
        for each piece of information in the encoded sequence of information:
            determining a first index location based on the number of groups, where the index location corresponds to a first hierarchical node;
            setting the first hierarchical node as the parent node;
            creating a pointer defining a relationship between the parent node and at least one leaf node, where the number of leaf nodes corresponds to the maximum number of child nodes for the first hierarchical node, thereby creating a subgroup of related leaf nodes within the sets of leaf nodes; and
            updating the first index location to correspond to the next hierarchical node in the at least one hierarchical node in the set of leaf nodes; and
        recursively generating the count index for each subgroup of related leaf nodes.

12. The non-transitory computer-readable medium of claim 11, further comprising looking up at least one item of the first sequence of information by traversing the at least one hierarchical node.

13. The non-transitory computer-readable medium of claim 12, wherein looking up at least one item of the first sequence of information includes the steps of
    receiving position information for the at least one item of information;
    determining branches of the at least one hierarchical node corresponding to the position information;
    determining a node of the lowest level of hierarchy corresponding to the at least one item of the first sequence of information.

14. The non-transitory computer-readable medium of claim 13, wherein the position information includes offset information.

15. The non-transitory computer-readable medium of claim 13, wherein looking up the at least one item of the first sequence of information is performed in O(log n) computation steps where n is the number of items of information in the first sequence of information.

16. The non-transitory computer-readable medium of claim 11, further comprising making at least one change to at least one leaf node.

17. The non-transitory computer-readable medium of claim 16, wherein the at least one change includes changing at least one count of the repetition of the repeated value.

18. The non-transitory computer-readable medium of claim 16, wherein the at least one change includes inserting at least one new leaf node.

19. The non-transitory computer-readable medium of claim 16, wherein the at least one change includes deleting at least one leaf node.

20. A computing device comprising:
    a data bus;
    a memory unit coupled to the data bus;
    a processing unit coupled to the data bus and directed to:
        encode a first sequence of information comprising a compression of at least one successive repetition of values in the first sequence of information;
        calculate a maximum number of child nodes based on a number of groups to group the encoded first sequence of information;
        group the encoded first sequence of information into sets of leaf nodes, each set having a number of leaf nodes that are no more than the calculated maximum number of child nodes, wherein each leaf node includes an identification of a repeated value and a count of the repetition of the repeated value; and generate at least one hierarchical node from the sets of leaf nodes wherein each of the hierarchical node at each level of hierarchy has a number of child nodes that are no more than the calculated maximum number of child nodes and maintains a sum of the count of the repetition of the repeated value of each descendant leaf node of the hierarchical node; and generate a count index for the encoded first sequence of information based on the sets of leaf nodes and the hierarchical nodes by:

for each piece of information in the encoded sequence of information:
determining a first index location based on the number of groups, where the index location corresponds to a first hierarchical node;
setting the first hierarchical node as the parent node;
creating a pointer defining a relationship between the parent node and at least one leaf node, where the number of leaf nodes corresponds to the maximum number of child nodes for the first hierarchical node, thereby creating a sub-group of related leaf nodes within the sets of leaf nodes; and
updating the first index location to correspond to the next hierarchical node in the at least one hierarchical node in the set of leaf nodes; and
recursively generating the count index for each sub-group of related leaf nodes.

\* \* \* \* \*